United States Patent
Duevel et al.

(10) Patent No.: US 7,526,457 B2
(45) Date of Patent: Apr. 28, 2009

(54) SYSTEMS AND METHODS FOR CONFIGURING SOFTWARE

(75) Inventors: Olaf Duevel, Mannheim (DE); Ulrich Frenzel, Heidelberg (DE); Wolfgang Herzog, Reilingen (DE); Gunther Liebich, Walldorf (DE)

(73) Assignee: SAP AG, Walldorf (DE)

( * ) Notice: Subject to any disclaimer, the term of this patent is extended or adjusted under 35 U.S.C. 154(b) by 910 days.

(21) Appl. No.: 10/981,504

(22) Filed: Nov. 5, 2004

(65) Prior Publication Data
US 2005/0138558 A1 Jun. 23, 2005

Related U.S. Application Data

(60) Provisional application No. 60/517,900, filed on Nov. 7, 2003.

(51) Int. Cl.
*G06N 5/00* (2006.01)
(52) U.S. Cl. .......................................... 706/11; 702/181
(58) Field of Classification Search ................... 706/11, 706/45, 47
See application file for complete search history.

(56) References Cited

U.S. PATENT DOCUMENTS

| 5,838,918 | A | * | 11/1998 | Prager et al. | ................. | 709/221 |
| 6,842,906 | B1 | * | 1/2005 | Bowman-Amuah | ......... | 719/330 |
| 6,961,937 | B2 | * | 11/2005 | Avvari et al. | ................. | 718/104 |
| 6,980,927 | B2 | * | 12/2005 | Tracy et al. | ................. | 702/181 |

\* cited by examiner

*Primary Examiner*—Wilbert L Starks, Jr.
(74) *Attorney, Agent, or Firm*—Finnegan, Henderson, Farabow, Garrett & Dunner, LLP

(57) ABSTRACT

Systems and methods are provided for configuring software. The software may be configured with wizard-like configuration levels, including configuration levels that may overlay previous ones. In one embodiment, a computer-implemented method is provided for configuring software. The method may include prompting a user to select a scenario for configuring the software, receiving, as input, a selected scenario from the user and further prompting the user to enter configuration data based on the selected business scenario. The method may also include applying at least one template to generate at least one configuration statement for the software, wherein the at least one template comprises a set of rules for generating the configuration statement based on the configuration data entered by the user.

48 Claims, 16 Drawing Sheets

SYSTEMS AND METHODS FOR CONFIGURING SOFTWARE

CROSS-REFERENCE TO RELATED APPLICATION(S)

This application claims the benefit of priority from U.S. Provisional Application No. 60/517,900, filed on Nov. 7, 2003, the disclosure of which is expressly incorporated herein by reference in its entirety.

BACKGROUND

I. Technical Field

The present invention generally relates to software and configurable software components. More particularly, the invention relates to systems and methods for configuring software, including systems and methods for performing multi-level configuration and/or wizard-like configuration of software.

II. Background Information

In today's marketplace, software is widely available and sold to a variety of users ranging from everyday consumers to large business entities. In some cases, a software provider will offer "standardized" software that is susceptible to little or no configuration by the user. In other cases, software will be provided that is capable of being configured or customized according to the needs of the end user or customer. One area in which configurable software is desirable to end users and customers is the business software and applications area.

Generally, there are two main tendencies regarding configurable business software. First, in order to increase re-useability of the software code, larger portions of software become configurable rather than hard-coded. Second, end user configuration should be easy to understand and should happen in a business-oriented language rather than a technical one. As will be apparent, these tendencies can conflict with one another and pose problems that have not heretofore been addressed.

In view of the foregoing, there is a need for improved systems and methods of configuring software, such as business software applications and components. For example, there is a need for a wizard-like configuration, that overlays the original configuration demand of the software, which may be too complex and structured too technically rather than being structured following business needs. Also, there is a need for delivery of ready to run pre-configurations (e.g., industry specific) that can simplify the set-up of a new system.

In the business software area and other areas, there is also a need for configurations that can be done on more than one level. For example, there is a need for systems and methods for performing multi-level configuration of software, wherein each level simplifies and/or makes more specific (and less abstract) the previous level. By way of example, it may be desirable to have a multi-level configuration of software. Such software would preferably include one or more of the following: a basic configuration by the producer of the software; business area specific and/or regional adaptations by resellers or other departments within the producing company; customer specific configuration(s) on a company group level as guiding or binding templates for companies inside the group; and/or end user configuration(s) in the customer's company.

Current software solutions do not address the above-identified needs. Furthermore, past attempts do not adequately support multi-level-configurations, such as multi-level-configurations with comprehensive release management for configuration content.

SUMMARY

Systems and methods consistent with the present invention relate to methods and systems for configuring software. As further disclosed herein, embodiments of the invention include systems and method for performing multi-level configuration and/or wizard-like configuration of software. Embodiments of the invention may be applied to various industries or areas, including software for the business and financial services areas.

In accordance with one embodiment, a computer-implemented method is provided for configuring software. The method may comprise: prompting a user to select a scenario for configuring the software; receiving, as input, a selected scenario from the user; further prompting the user to enter configuration data based on the selected scenario; and applying at least one template to generate at least one configuration statement for the software, the at least one template comprising a set of rules for generating the at least one configuration statement based on the configuration data entered by the user.

In accordance with another embodiment, a computerized system is provided for configuring software. The system may comprise: a graphical user interface (GUI) module for generating one or more graphical interfaces to provide output to and receive input from a user, the GUI module being adapted to generate at least one graphical interface to prompt the user to enter configuration data based on a selected scenario; a content repository module for providing at least one configuration statement to configure the software based upon the selected scenario and the configuration data entered by the user; and an active content module for storing the at least one configuration statement to configure the software.

In accordance with another embodiment, a method is provided for configuring software. The method may comprise: prompting a user to make a selection from a plurality of scenarios displayed on a graphical user interface; receiving configuration data from the user to configure the software in accordance with the selected scenario; generating at least one configuration statement using one or more templates and the configuration data received from the user; and storing the at least one configuration statement in memory, the at least one configuration statement being accessible in a run-time environment to configure the software.

In accordance with yet another embodiment, a method is provided for multi-level configuration of software. The method may comprise: providing basis content for the software; prompting a user to select among a plurality of different business scenarios; based on the business scenario selected by the user, further prompting the user enter configuration data; and processing the configuration data entered by the user to generate at least one configuration statement for one or more content levels that configure the basis content of the software.

In accordance with yet another embodiment, a computer readable medium is provided comprising programmable instructions adapted to cause a processor to perform a method for configuring software. The method comprises: prompting a user to select a scenario for configuring the software; receiving, as input, a selected scenario from the user; further prompting the user to enter configuration data based on the selected scenario; and applying at least one template to generate at least one configuration statement for the software, the at least one template comprising a set of rules for generating the at least one configuration statement based on the configuration data entered by the user.

It is to be understood that both the foregoing general description and the following detailed description are exemplary and explanatory only and are not restrictive of the invention or embodiments thereof, as claimed.

BRIEF DESCRIPTION OF THE DRAWINGS

The accompanying drawings, which are incorporated in and constitute a part of this disclosure, illustrate various embodiments and aspects of the present invention. In the drawings:

FIG. 6 illustrates an exemplary user interface for prompting and entering configuration data, consistent with an embodiment of the invention;

FIG. 11A illustrates an example of the complete content that may be generated for the configuration of software, wherein the content includes templates;

DESCRIPTION OF THE EMBODIMENTS

Figure 1:
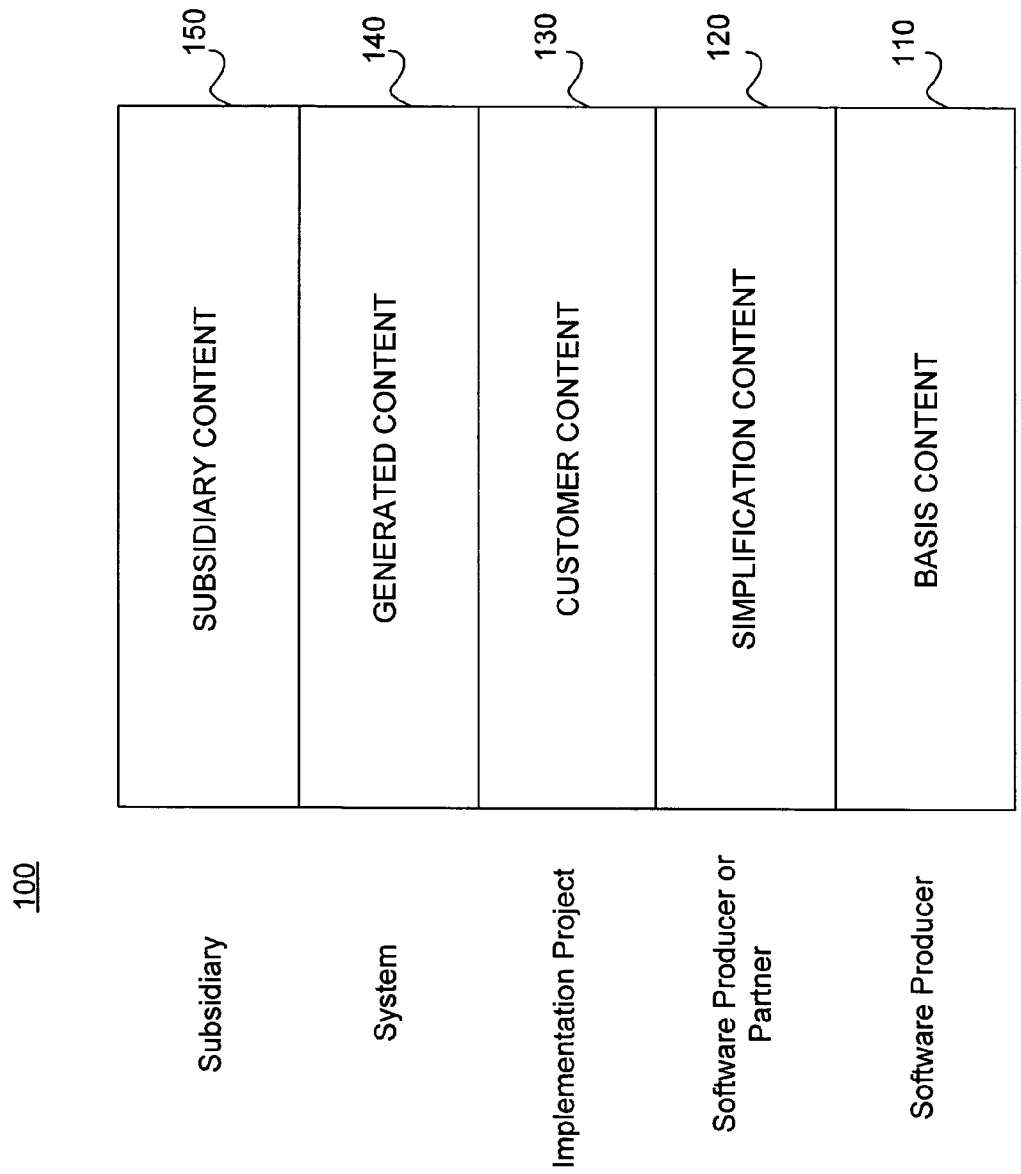
FIG. 1 is a diagram of exemplary content hierarchy for configurable software, consistent with an embodiment of the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

Consistent with the present invention, systems and methods are provided for configuring software. As used herein, the term "software" encompasses any and all types of software, including computer software, computer program products, and program modules and components, including business and financial software applications and components.

Consistent with embodiments of the invention, systems and methods may be provided for configuring software components. As used herein, a configurable software component refers to a software component that has its configuration needs defined by configuration aspects. A configuration aspect may comprise metadata which describes the information that is needed by a configurable software component to perform its tasks. A configuration aspect may also comprise metadata introduced by a configuration file that describes more specific terms, such as business-oriented terms. By way of non-limiting examples, configuration aspects may be implemented using a relational database table or an XML schema definition. A single attribute of a configuration aspect is referred to herein as a configuration attribute.

As further disclosed herein, a configuration statement may comprise a collection of attribute values. A configuration statement provides elementary information (i.e., instances) of a configuration aspect. By way of example, in cases where a configuration aspect is embodied as a relational database table description, a configuration statement may comprise a line (i.e., a record) in the relational database. As a further example, where the configuration aspect is an XML schema definition, the configuration statement may comprise an XML document.

Consistent with other embodiments of the invention, systems and methods may also provided for multi-level configuration of software. Such a multi-level configuration may allow customers and other users to configure software according to one or more content levels. Such content levels may comprise: a basic configuration by a software producer; business area specific and/or regional adaptations by resellers or other departments within the producing company; customer specific configuration(s) on a company group level as guiding or binding templates for companies inside the group; and/or end user configuration(s) in the customer's company.

As further disclosed herein, systems and methods may be provided for multi-level configuration of software using a wizard-like configuration process. With a wizard-like configuration, configuration levels may overlay other or previous levels. Wizard-like configuration levels may be "user-friendly" and permit the user to respond to prompted requests for information, which in turn configure the software. The prompted requests or questions may be constructed using a business-orientated language or more abstract language as opposed to technical language. For example, in one embodiment, a user may be prompted to select among different business scenarios and/or other objects or goals to configure the software.

Figure 2:
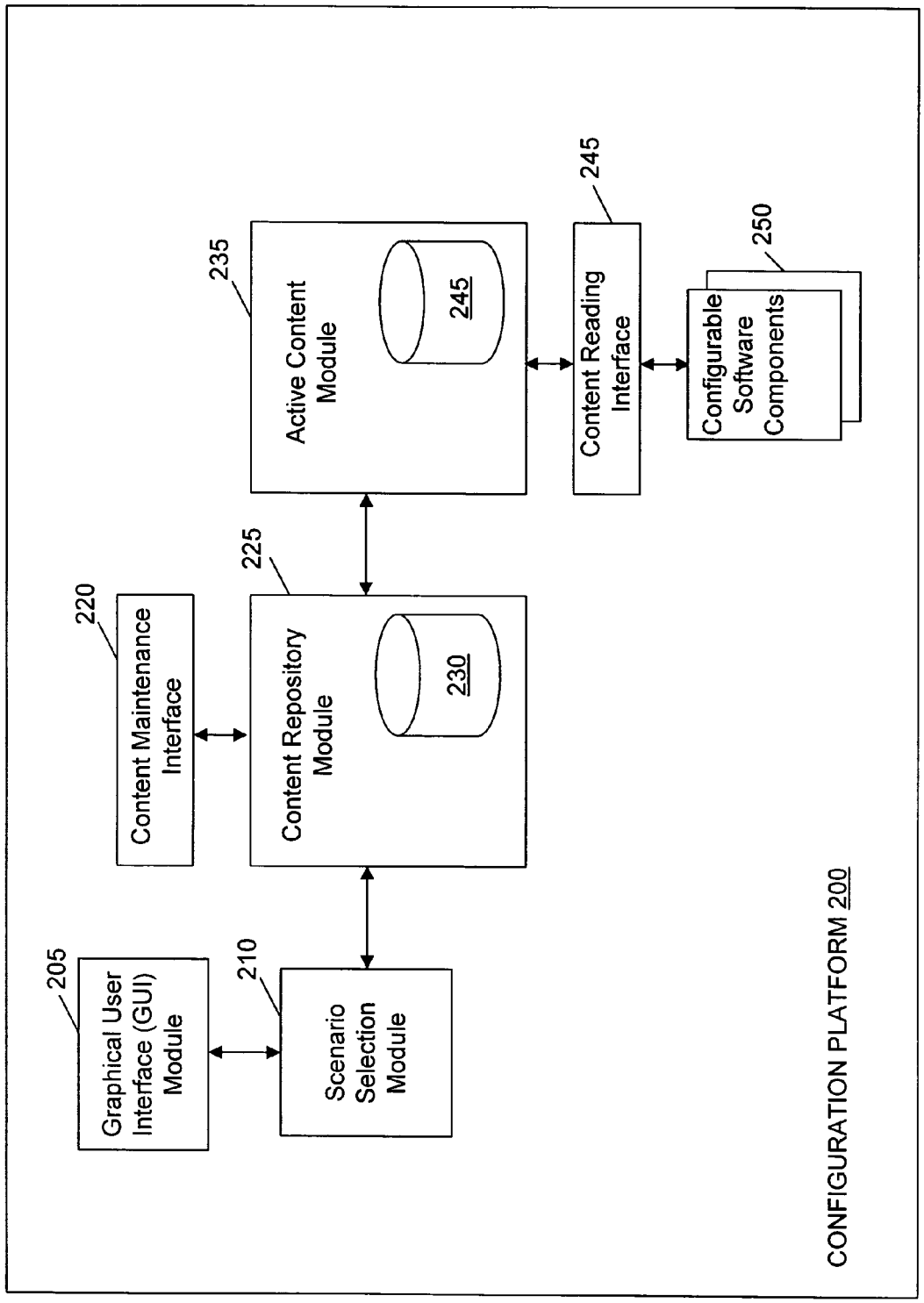
FIG. 2 is a diagram of an exemplary platform or framework for configuring software, consistent with an embodiment of the present invention.

Embodiments of the present invention are also directed to configuration frameworks and architectures for configuring software components (see, e.g., FIG. 2). Such a framework may be created through any suitable combination of hardware, software and/or firmware. In one embodiment, the configuration framework is created through one or more applications executed in a computing-based environment, such as a single- or multi-user computing environment. The content handled by these applications, including configuration files and packages, may be XML-based documents. Examples of computing environments include the R/3 system and NetWeaver, both commercially available from SAP AG (Walldorf, Germany).

A configuration framework, consistent with embodiments of the present invention, may support multi-level configurations of software and may include wizard-like configuration levels that overlay previous ones.

Figure 4:
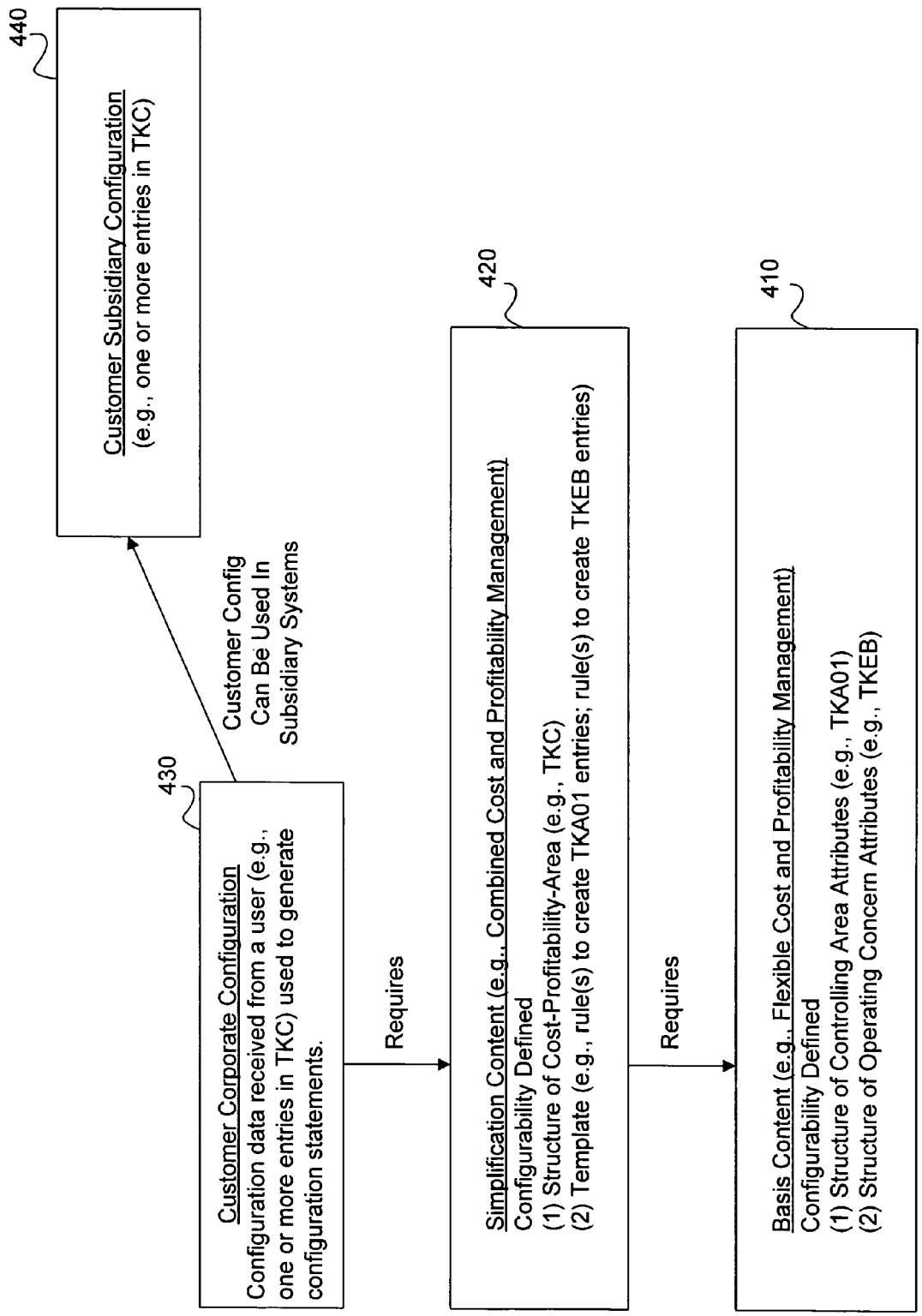
FIG. 4 illustrates an example of software with a multi-level configuration, consistent with an embodiment of the invention.

In one embodiment, the configuration is organized in and/or through hierarchically dependent content (see, e.g., FIGS. 1 and 4). As disclosed herein, content may comprise one or more configuration files or, when using release management, one or more configuration packages. A configuration package may comprise one or more configuration files. Consistent with an aspect of the invention, a configuration file may depend on other configuration files and, generally, specifies what is required for a configuration. In one embodiment, a configuration file may include a list of required, lower level configuration files. Further, any set of configuration files related to a scenario should not be cyclically dependent. In other words, a set of configuration files may not exist whereby each configuration file, except the last one, requires the next one and the last file requires the first one. Additionally, or alternatively, a configuration file may comprise, in any combination, one or more configuration aspects, configuration statements, constraints, and/or templates for generating configuration statements. Examples of templates are further described below with reference to, for example, FIG. 5.

Consistent with another aspect of the invention, configuration packages may inherit the notion of "requiring." Thus, consistent with an aspect of the invention, a configuration package (such as package A) may require another configuration package (such as package B), if any of the configuration files of package A require any of the configuration files of package B.

Consistent with a further aspect of the invention, a content level may comprise a collection of configuration packages. Content levels may also inherit the notion of "requiring." Thus, a first content level (such as content level A) requires a second content level (such as content level B) if any of the configuration packages of the content level A require any of the configuration files of content level B. Consistency constraints may also be applied to content levels and, thus, a partial order between content levels may be enforced in a similar manner to that described above for configuration files.

Consistent with yet another aspect of the invention, a scenario may correspond to a collection of content levels. In one embodiment, a valid scenario fulfills the following property: for every content level contained in a scenario, the scenario also contains every required content level.

Embodiments of the invention may also utilize configuration constraints. A configuration constraint may be a rule describing required dependencies between configuration statements. For example, a constraint may be set on a group content level so that if a user tries to make a change to a value that violates the rule, an error is displayed. As a further example, assume a configuration constraint is set on a group content level, such as an attribute value group currency (e.g., Euro) in a configuration aspect group setting. If in a subsidiary someone tries to set a group currency to a different value (e.g., British pound), an error message can be displayed that the constraint was violated and that the entry cannot be saved in the subsidiary content file.

The format of a configuration file may unify all aspects of a configuration, including configuration aspects (e.g., metadata defining the configuration needs of the software), configuration statements, constraints, as well as templates for generating configuration statements. In accordance with one embodiment, a template may include one or more rules to generate configuration statements. Rules may comprise, alone or in any combination, statements, formulas and/or instructions. By way of example, a statement may indicate a value and a formula may comprise an algorithm for computing configuration statements. As a further example, a rule may also be expressed in the form of an instruction, such as an if-then-else or conditional instruction. Further examples of templates and rules are described below with reference to FIG. 8.

As disclosed herein, a configuration may be organized in and/or through hierarchically dependent content. Each content level may comprise a bundling of configuration files. A content level may be created by a specific entity, such as a software producer. Other content levels may be created or defined by other entities (see, e.g., FIG. 1). In one embodiment, users may have specific roles in implementing a multi-level configuration platform. A developer may define the configuration aspects that are needed by a configurable software component. A content developer, using an authoring user interface (UI), may set up configuration files. A configurator may enter configuration data using a wizard-like interface and/or by entering configuration statements.

In one embodiment, a mechanism may be provided to "add" one configuration file onto another. Thus, a higher-level file may enhance or restrict configuration aspects, configuration statements, constraints, and/or templates of a lower level file. In turn, a lower level file can allow or disallow any of the above for higher levels of configuration.

In another embodiment, an end user configuration is made up of a selection of configuration files. The files may have different authors and may be maintained at different places (such as "producer of the software", "reseller", "group", etc.).

In still another embodiment, support for multi-level distribution of software content may be provided through release management for the configuration files, which as discussed above, may be bundled into a configuration package. Release management may include maintaining different versions and managing dependencies between different levels of configuration and/or different configurable software components.

In yet another embodiment, a wizard-like configuration can be created via a higher-level file containing new metadata (which is simpler and more business oriented) and templates, that generate content into the old metadata based upon content out of the new metadata. The latter content may be maintained by an end user.

Consistent with another embodiment of the invention, one or more graphical user interfaces (GUIs) may be provided for enabling wizard-like configurations. The GUI may serve as a user-friendly interface to permit a customer or user to configure the software. Through the GUI, the user may be prompted with instructions for the configuration. These prompts may be non-technical or orientated according to the needs of the user (such as business-orientated language). Further, these prompts may be presented through a set of questions, input forms, tables, diagrams, charts and/or any other form of presentation. In one embodiment, one or more wizard-like tables (such as a business-orientated tables) may be predefined and stored in memory to provide high level abstractions and to drive the GUI and entry of configuration settings by the user.

Configuration settings entered by a user may be checked for consistency and/or syntax by a configuration platform or engine. The configuration platform, which may be an XML-based solution, may perform other functions, including evaluating stored templates for mapping the user's entries for one or more business tables (high level abstraction) to one or more stored technical tables (low level abstraction) and/or checking for constraints or limitations on configurations for lower levels. Through the configuration platform and its associated functionality, entries from the user may be used to configure software, including on multiple-levels.

As indicated above, any suitable combination of hardware, software and/or firmware may be used to implement embodiments of the invention. Further, embodiments of the invention may be implemented in various environments. For example, in one embodiment, systems and methods for configuring software are implemented with a special purpose application or one or more software modules running on any one of the following devices: a conventional personal computer (PC), a server, a workstation, a hand-held device, a multiprocessor computer, a pen computer, a microprocessor-based or programmable consumer electronics device, a minicomputer, a mainframe computer, a personal mobile computing device, a mobile phone, or a palmtop computer.

When configuring software components, systems and methods consistent with the present invention may provide functionality such that a user may engage in a wizard-like configuration. For example, the user may provide certain data through the use of a wizard-like interface. Once the user has provided the data, a configuration engine or framework may process the data and perform data mapping by implementing configuration statements. Accordingly, the user input is a high level abstraction, which is then used by the configuration platform or framework to translate the input into a lower level abstraction that is suitable for use by the software. During the processing, the configuration platform or framework may perform mapping and may also check for consistency and syntax.

As disclosed herein, systems and methods consistent with the present invention may support multi-level configurations of software. The software may comprise one or more content levels. By way of example, FIG. 1 is a diagram of exemplary hierarchy content for a multi-level software configuration, consistent with an embodiment of the present invention. As shown in the diagram 100 of FIG. 1, different content levels of the software may be represented in the content hierarchy. Higher content levels in the hierarchy may be dependent on lower content levels. Each content level may be created or configured by a specific entity. These entities (examples of which are identified to the left in FIG. 1, such as a "software producer," "software partner", etc.) may provide part of the software, configure the software, and/or otherwise add to the software.

As illustrated in FIG. 1, the content hierarchy may include a basis content 110. The basis content 110 may comprise the fundamental or base content of the software and may be created by a software producer. The software producer may be a company that produces or provides software, such as a business and/or financial software producer, for example. For the basis content, programmers or other individuals of the software producer may determine and provide the fundamental workings and basis content of the software. In the case of business or financial software, the basis content may comprise basic configuration aspects for basic financial components, such as forecast and profitability management, general ledger accounting, and inventory accounting. At the basis content level, a maximum level of flexibility exists in terms of additional content and configurations. This is because the basis content does not depend on any other content levels.

In addition to the basis content 110, simplification content 120 may also be provided. This content level, which may be created by a software producer or partner, may comprise content that determines more specific functionality of the software. Such functionality may be industry specific or business-orientated. By way of example, the simplification content may define a configuration on a simplified level, such as a particular scenario. A particular scenario could be a business-related scenario, such as a scenario for combined cost and profitability management or for specific, accounting for different industry sectors or regions. As a further example, through a scenario selection, a customer could be permitted to chose between simplified and more general accounting scenarios. As part of the simplification content level, configuration files comprising, for example templates, may be defined to control how to evaluate each particular scenario. Templates may include any set of rules (e.g., statements, formulas, and/or instructions) which indicate how the data entered by a customer or user (customer content level) or provided by lower content levels are processed to generate configuration statements, such as table lines, XML documents and/or other information to configure the software.

As further shown in FIG. 1, customer content 130 and/or generated content 140 may also be provided. For customer content 130, an implementation project team of the customer may determine specific customer content and functionality for the software. To do so, a wizard-like interface may be utilized to configure software modules or components. As disclosed herein, a user interface (e.g., comprising one or more GUIs) may be provided to allow a user to select a scenario and/or enter configuration data in response to displayed questions or prompts. The selections and/or data entered by a customer or user may then be used by the configuration framework or platform to automatically generate additional content 140 to configure the software. In one embodiment, configurations statements are generated using templates provided as part of the simplification content 120 comprising parameters for particular scenario(s). Templates may include statements, formulas, and/or instructions which are used by the configuration system to process the data entered by a customer and generate the content 140.

As further illustrated in FIG. 1, the content hierarchy may also include subsidiary content 150. Subsidiary content may be provided to further configure the software, as needed, for specific subsidiaries or units of the customer. This may be useful for customers, such as large corporations, business organizations or governmental entities, which require specific configurations for their subsidiaries or units. For instance, a business customer with subsidiaries in different regions or countries may need specific configurations to take into account differences, such as in currency or reporting cycles or tax calculation rules. As with other content levels, subsidiary content may be generated by a customer or user through a wizard-like, user interface that includes questions or prompts to collect input from the user.

As will be appreciated by those skilled in the art, the hierarchy content illustrated in FIG. 1 is exemplary. Modifications and/or substitutions can be made to the content levels, and it is also possible to provide a more simplified hierarchy structure by eliminating or combining specific content levels. Such alternations and additional embodiments may be achieved according to the needs of the customers or users, and the overall flexibility of the multi-level software configuration.

Referring now to FIG. 2, a diagram is provided of an exemplary platform or framework for configuring software, consistent with an embodiment of the present invention. In FIG. 2, an exemplary configuration platform 200 is shown which may be used to configure software. Configuration platform 200 may include one or more software applications or modules, including a scenario selection module 210, a content repository module 225, and an active content module 235.

Scenario selection module 210 may provide a list of business scenarios for configuring one or more software components. The list may be presented or displayed to a user to allow the user to make a selection. This may be achieved through the assistance of a graphical user interface (GUI) module, such as GUI module 205. Based on the scenario selected by the user, one or more additional GUIs may be presented to gather the necessary configuration data from the user. The applicable GUIs may be identified by content repository module 225 based on the selected scenario and then communicated to scenario selection module 210 for presentation to the user via GUI module 205. As further disclosed below, a content maintenance interface 220 may be provided to allow such GUIs to be created and maintained in content repository module 225.

Content repository module 225 may store GUIs and other content in database 230. Further, content repository module 225 may be configured to perform various functions, including generating configuring statements based on a user's input and creating configuration files or packages. Content repository module 225 may be interfaced with both scenario selection module 210 and active content module 235, as well as system administrators or content developers through content maintenance interface 220.

Active content module 235 may be provided for activating new content and to facilitate the reading of active content by one or more configurable software components 250. Active content may be stored in database 245 and, as more fully discussed below, comprise configuration files or packages including configuration statements. Such content may be created and provided as output from content repository module 225, as disclosed herein.

As illustrated in FIG. 2, configuration platform 200 may include a GUI module 205. Under the instructions of scenario selection module 210 and content repository module 225, GUI module 205 may generate one or more graphical interfaces to provide output to and receive input from a user. Through GUI module 205, a user may control configuration platform 200 and, more particularly, content repository module 225, to configure software. In one embodiment, GUI module 205 may implement a wizard-like interface for configuring software without requiring the user to have a technical understanding or specific programming skills.

As further shown in FIG. 2, configuration platform 200 may also include a content reading interface 245 to facilitate communication between active content module 235 and one or more configurable software components 250. In one embodiment, active content module 235 may activate content for configurable software components 250. Activation of the content may comprise, for example, processing configuration files or packages and updating existing files or packages in database 245. In one embodiment, configuration software components 250 may query active content module 235 to determine if any active content exists in database 245 to configure the software components during runtime. In another embodiment, notification may be sent to the configurable software components when there is an update to database 245. Such a notification may trigger configurable software components to read the new content via content reading interface 245.

Content maintenance interface 220 may provide an interface to allow system administrators and developers to enter and maintain configuration aspects, GUIs and other content via content repository module 225. For example, using interface 220, GUIs may be created and maintained for prompting a user to select a scenario or enter configuration data. Further, configuration aspects, templates, constraints may be entered and maintained via the content maintenance interface 220. As described above, such items may be stored in database 230.

In operation, scenario selection module 210 may be invoked to enable a user to select a business scenario. Each business scenario may describe a business-related scenario for configuring software (such as flexible cost and profitability management). In one embodiment, the user is prompted by a graphical user interface (not shown) generated by GUI module 205 to make a selection of a business scenario. Once the business scenario has been selected, the user may be prompted by one or more additional GUIs (not shown) to provide configuration data required by the selected configuration scenario. Content repository module 225 may store the configuration data entered by the user in database 230. In one embodiment, content repository module 225 may apply the metadata of one or more configuration aspects to create one or more configuration statements based on the data received from the user. Additionally, or alternatively, content repository module 225 may generate configuration statements by processing the configuration data using templates (contained in lower content levels). The resulting configuration statement(s) (making up the customer content level) together with configuration statements of configuration files in lower content levels may be merged into one or more configuration files or one or more configuration packages. The merged content may then be communicated to active content module 235, which stores the merged content in database 245. In addition, the content may be activated by active content module 235 and, optionally, notification may be sent to configurable software components 250. In one embodiment, it is possible to maintain inactive content at content repository module 225 or elsewhere so that it may be test and modified (as needed) before being activated by active content module 235.

Figure 3:
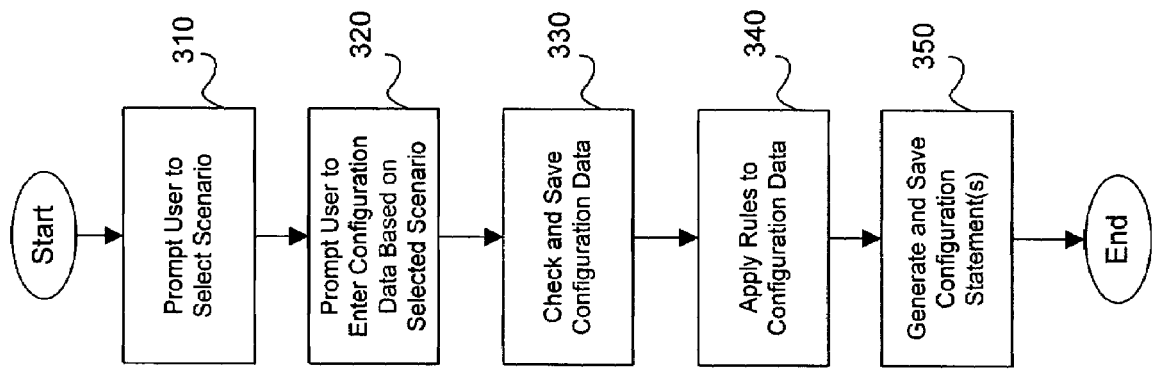
FIG. 3 is a flow diagram of an exemplary method for configuring software, consistent with an embodiment of the present invention.

Referring now to FIG. 3, a flow diagram is provided of an exemplary method 300 for configuring software, consistent with an embodiment of the present invention. At the start of the process, a user may select a scenario (step 310). As part of this step, a user interface (such as a GUI) may be provided to prompt the user to make a selection from a plurality of scenarios, such as a plurality of business scenarios. As described above, this may be implemented through, for example, GUI module 205 of configuration platform 200 (see FIG. 2). A business scenario may relate to a business-oriented task to implement using the software. In one embodiment, pre-configured scenarios or solutions may be provided. Such solutions may comprise templates that can be used to generate configuration statements. As disclosed herein, a template may include one or more rules. The rules may used by the configuration system or platform to process data entered by a customer and to automatically generate configuration statements for configuring the software consistent with the business scenario. Configuration statements may be represented by metadata, for example.

Figure 13A:
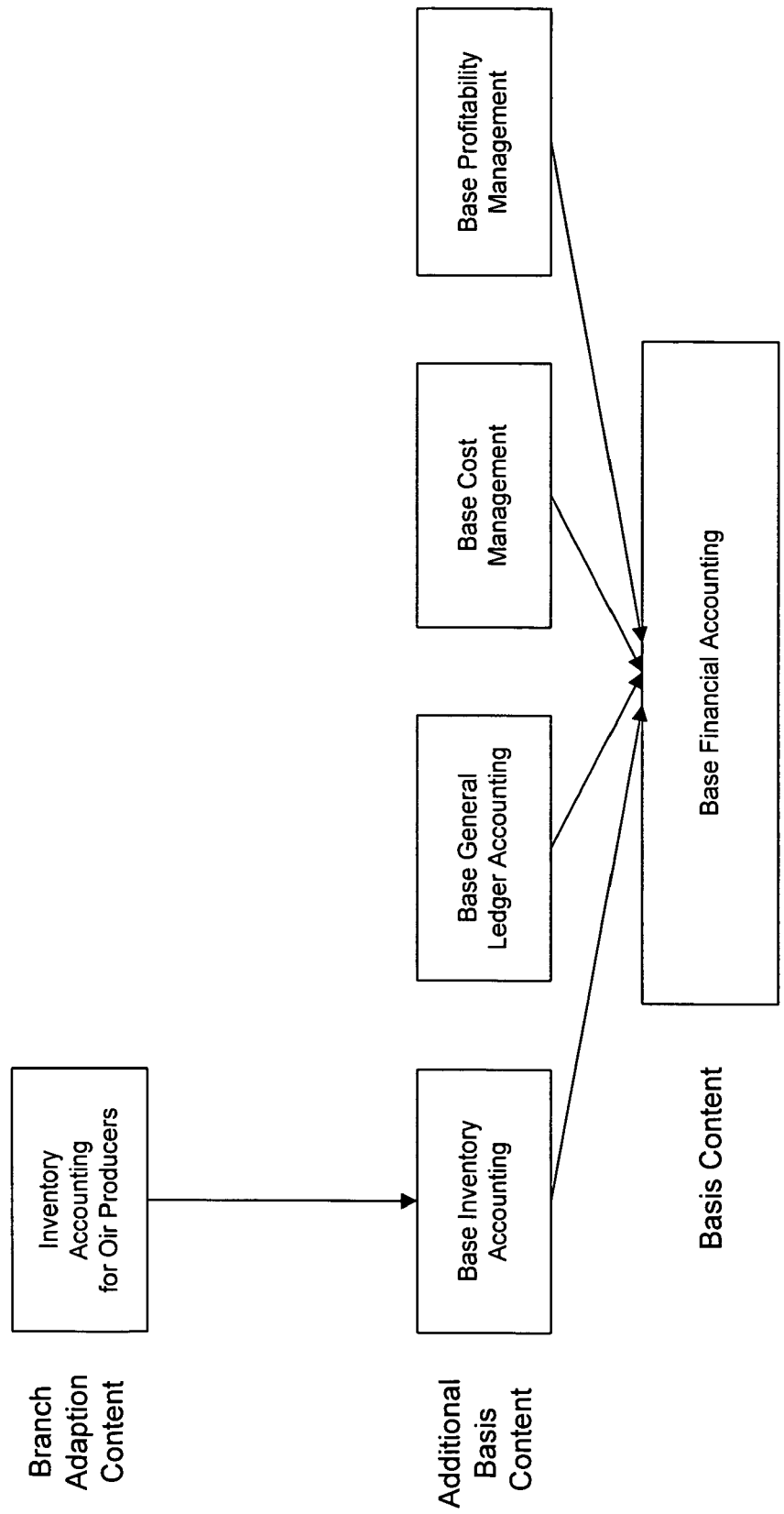
FIGS. 13A, 13B and 13C illustrate exemplary content levels for a plurality of scenarios (Scenarios I, II and III).
Figure 13B:
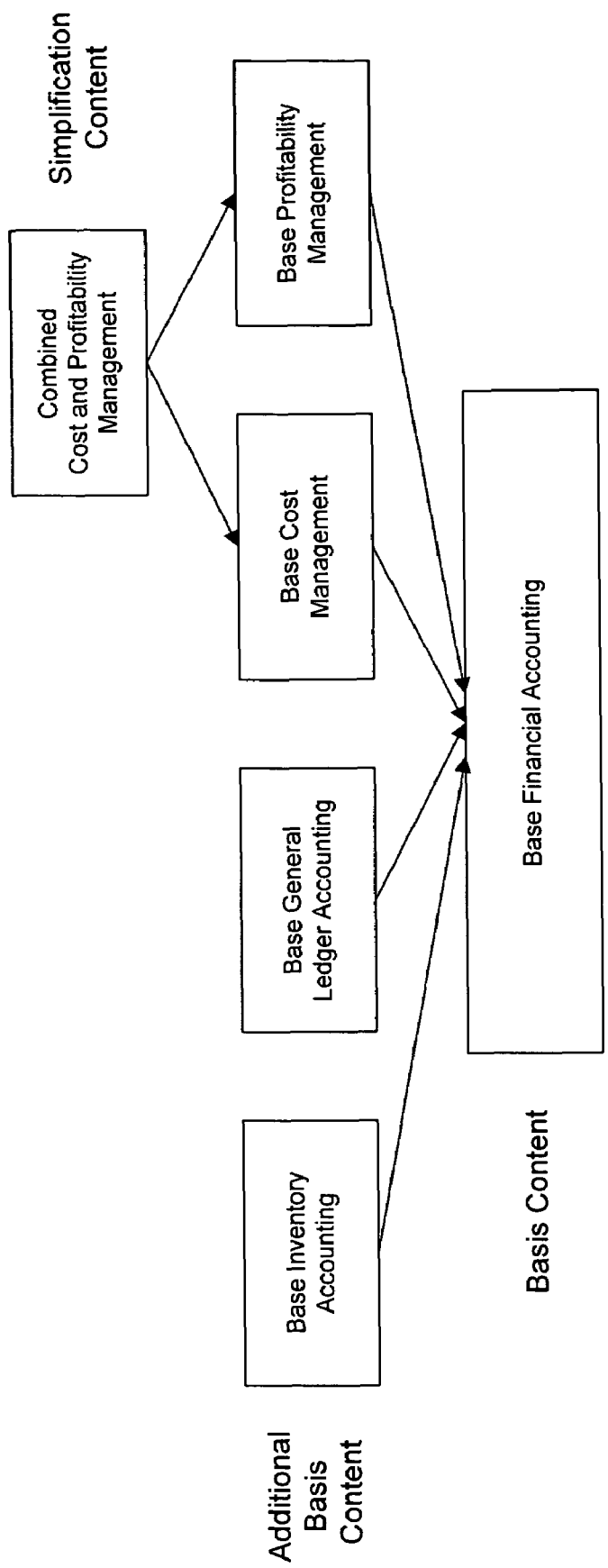
Figure 13C:
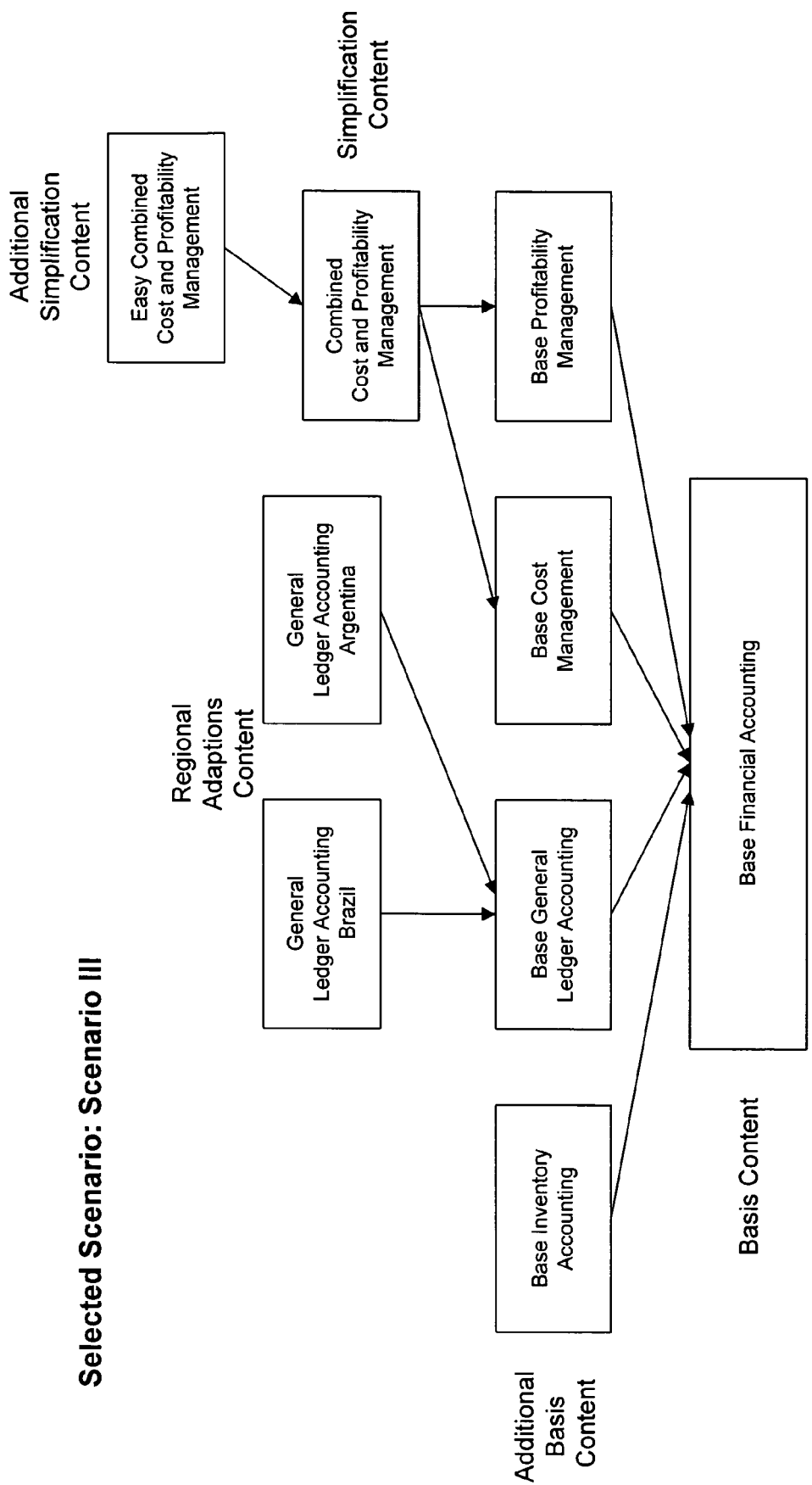

Consistent with embodiments of the invention, any number and type of scenarios may be presented to a user, with each scenario being related to or implicating one or more content levels. By way of example, a user could be given the option to select from one of the following scenarios: Scenario I: Financial accounting with inventory for oil producing needs; Scenario II: Financial accounting with combined cost and profitability management; and Scenario III: Financial accounting with easy combined cost and profitability management and general ledger adaptions for subsidiaries (e.g., Brazil and Argentina). FIGS. 13A to 13C provide examples of the hierarchy of content levels which could be implicated by each of the Scenarios I-III, respectively. As shown, certain content levels (such as the basis content and simplification content) may have more than one level. Further, in each scenario, additional content levels (such as customer and subsidiary content) may be added on top of the basis content and other provided content levels.

Once a scenario is selected, the user may be prompted to enter configuration data (step 320). Once again, the user may be prompted through a user interface, such as a user-friendly GUI. Any prompts or questions may be presented using business-orientated language. In one embodiment, wizard-like configuration of the software may be provided through the configuration system or platform (see, e.g., FIG. 2). For instance, the configuration system may examine the scenario selected by the user (selected at step 310) and automatically determine what content levels are required for that scenario and, moreover, what content is required at each level. Based on this analysis, the system may present questions or prompts to the user for input of the applicable content or configuration data (step 320). By way of example, in the embodiment of FIG. 2, scenario selection module 210 and GUI module 205 may prompt the user for the applicable configuration data based on the scenario that was selected. These prompts may be driven by content repository module 225, which determines the necessary configuration aspect(s) and/or template(s) from database 230 based on the selected scenario and, based thereon, selects the necessary GUIs to prompt the user. In one embodiment, one or more configuration aspect(s) and/or template(s) may be related to a scenario and define the configuration data that is required from the user.

The configuration data entered by the user (step 320) may be checked and, if no errors are found, saved in memory (step 330). In one embodiment, the data entered by the user may be checked for errors, such as errors in form or syntax. In one embodiment, the data entered by the user may be checked against one or more predefined consistency constraints to determine if a constraint is violated. If any data entered by the user is determined to contain an error, then the user may be prompted to re-enter the data until no errors are found. The user interface may include drop-down windows, menus, instructions and/or text to assist the user in entering the configuration data. As will be appreciated, step 330 may be implemented through a configuration system, such as configuration platform 200 of FIG. 2, using content repository module 225, scenario selection module 210, GUI module 205 and/or an error checking module (e.g., provided as part of content repository module 225 or separately).

As indicated above, templates, for example, may be defined for enabling configurations in accordance with the scenario selected by the user. In accordance with one embodiment, each template may comprise a set of rules for processing the data entered by the user (step 340). By applying the rules to the configuration data, one or more configuration statements may be generated and stored (step 350). Configuration statements may also be created by applying the configuration data in accordance with the requirements of one or more configuration aspects. In either case, the configuration statements may ultimately be used to configure the software. Other configuration information (constraints, etc.) may also be generated as part of step 350 to configure the software.

As described above with reference to FIG. 1, the configuration of software may be performed using a multi-level configuration approach. The scenario selection(s) and configuration data entered by the user may create configuration content on one or more levels. Further, in the case of configurations based on templates, the set of rules of each template may generate configuration statements for one or more content levels based on the user-defined configuration data. Moreover, configuration statements may be generated by applying the rules of the templates.

For purposes of illustration, FIG. 4 provides an example of a multi-level software configuration. In this example, the basis content 410 relates to business or financial software. In particular, basis content 410 may comprise content for cost and profitability management. This content may be flexible in terms of the scope of possible configurations and may comprise at least one metadata declaration (configuration aspect). In one embodiment, to configure basis content 410, one or more configuration aspects may be defined. For example, as illustrated in FIG. 4, there may be a configuration aspect in the form of a relational database table (TKA01 table) for controlling cost management and a relational database table (TKEB table) for controlling profitability management. As further disclosed herein, the TKA01 table may provide a configuration aspect containing definition and steering parameters for controlling areas, and the TKEB table may provide a configuration aspect containing definitions and steering parameters for profitability areas.

Figure 5:
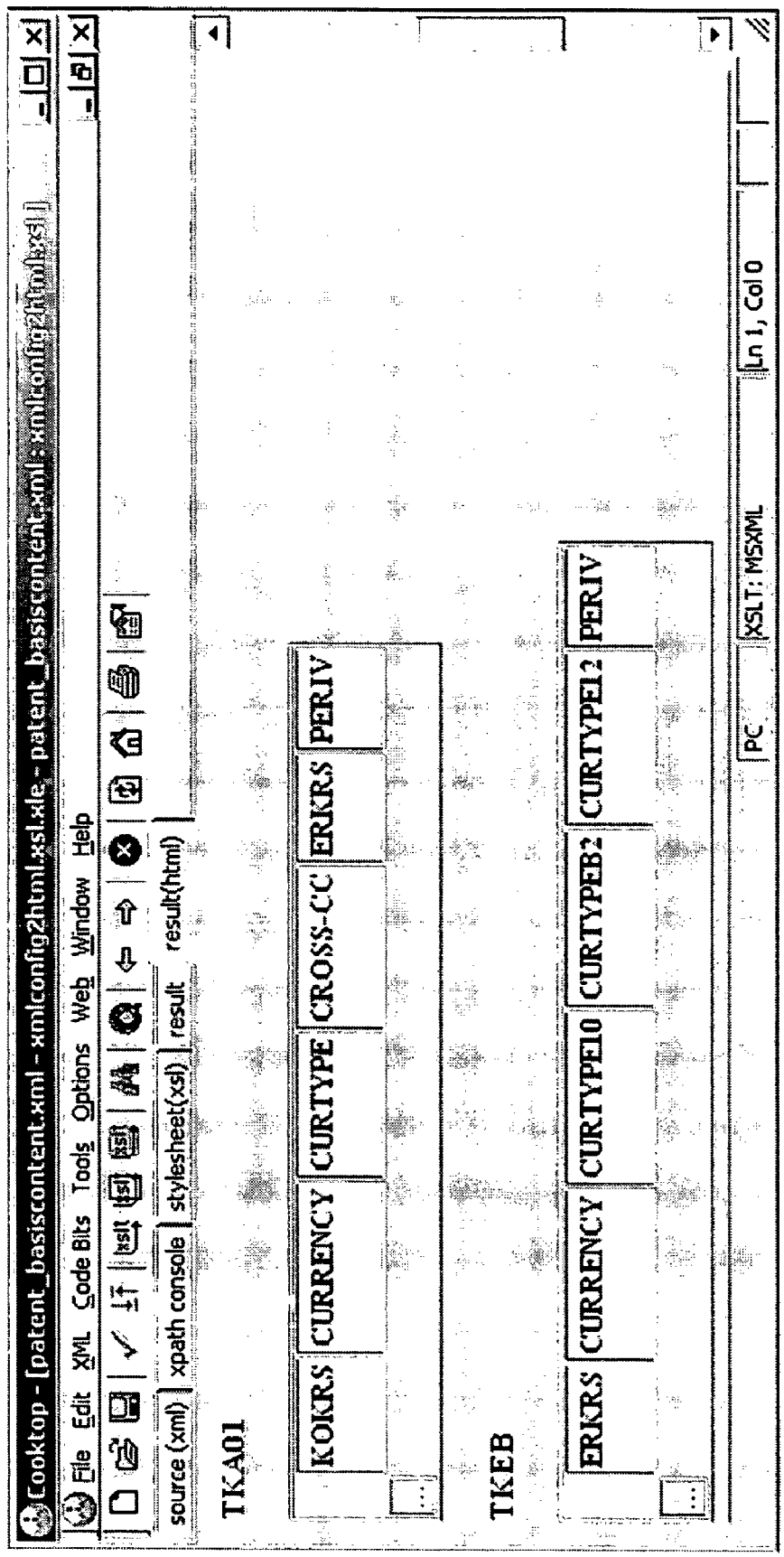
FIG. 5 illustrates examples of configuration aspects related to the basis content of the exemplary software configuration of FIG. 4.

FIG. 5 illustrates examples of the TKA01 and TKEB tables of the exemplary embodiment of FIG. 4. Each table, TKA01 and TKEB, for example, represents a configuration aspect of the software. Each configuration aspect is represented by, for example, the columns in a relational database table. Alternatively, the configuration aspects may be implemented in other forms, such as a XML schema definition. Each configuration aspect includes a number of parameters that specify what information is required to configure the software. For instance, the TKA01 table includes a number of parameters, such as the controlling area parameters "KOKRS," "CURRENCY," CURTYPE," "CROSS-CC," "EKRKS", and "PERIV." The "KOKRS" parameter may specify a controlling area; the "CURRENCY" parameter may specify a currency used by a profitability area or controlling area; the "CURTYPE" parameter may specify a currency type; the "CROSS-CC" parameter may specify a cross company code; the "EKRKS" parameter may specify a profitability area; and the "PERIV" parameter may specify a fiscal year variant. Further, the TKEB table includes a number of parameters, such as the profitability area parameters "ERKRS," "CURRENCY," "CURTYPE10," "CURTYPEB2," CURTYPE12," and "PERIV." The "EKRKS" parameter may specify a profitability area; as indicated above, the "CURRENCY" parameter specifies a currency used by a profitability area or controlling area; the "CURTYPE10" and "CURTYPE12" parameters are selection parameters whereby a user may specify whether all values should be shown apart from the general currency in the currency of the company; the "CURTYPEB2" parameter is a selection parameter whereby a user may specify whether all values should be shown apart from the general currency in the currency of the profitability area; and the "PERIV" parameter, as set forth above, may specify a fiscal year variant.

In one embodiment, the TKA01 and TKEB tables, as shown in FIG. 5, may not contain any configuration data prior to configuration of the software. Instead, such configuration data may be added according to input from a user and, thereby, create configuration statements. In another embodiment, the configuration data may be predefined, for example, by the software producer, partner or other entity, and delivered as part of the basis content, such as basis content 410 described in connection with FIG. 4. In such a case, the customer or user may modify or keep any part of the configuration data during implementation or configuration of the software.

Figure 6:
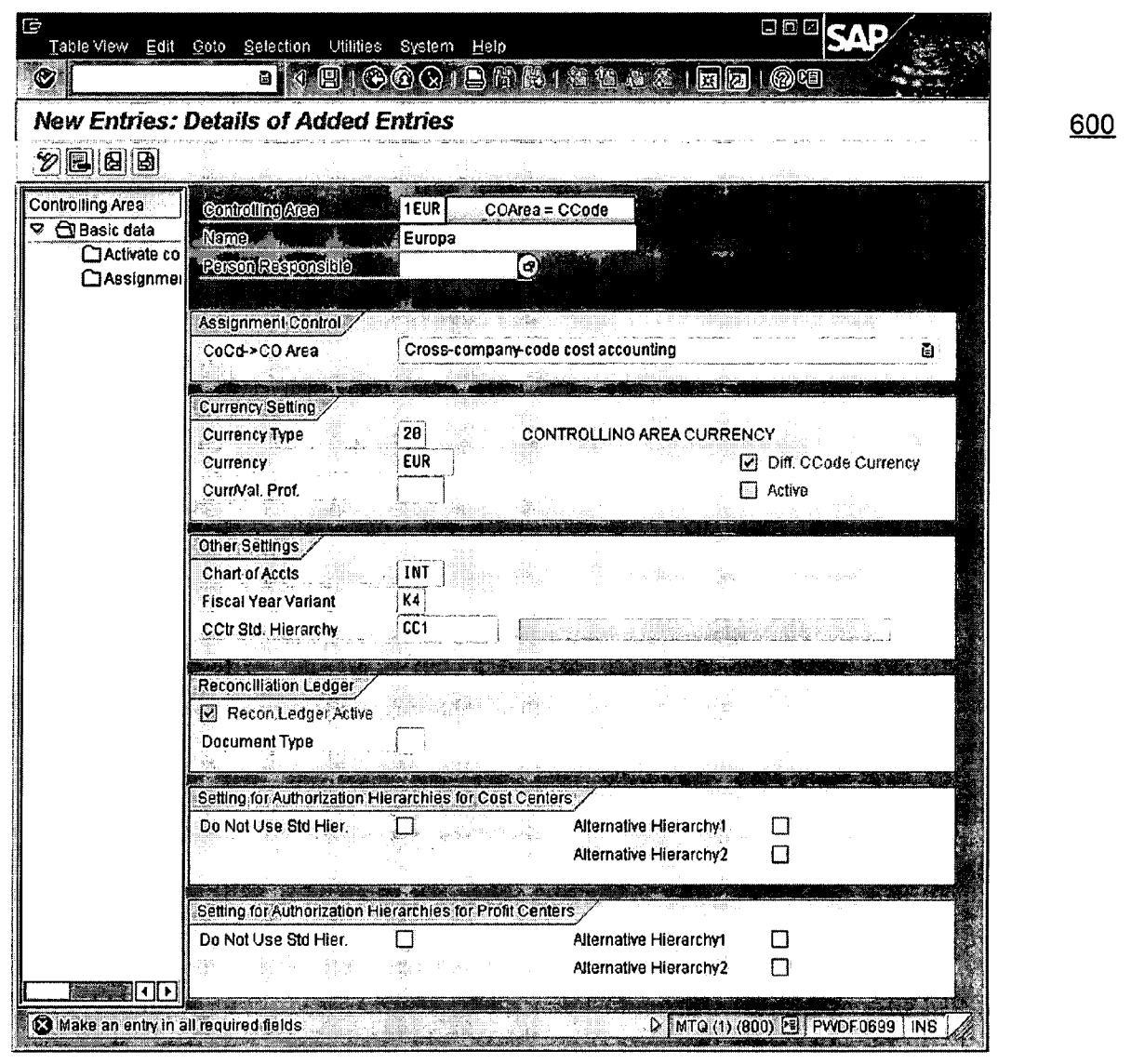
Figure 7:
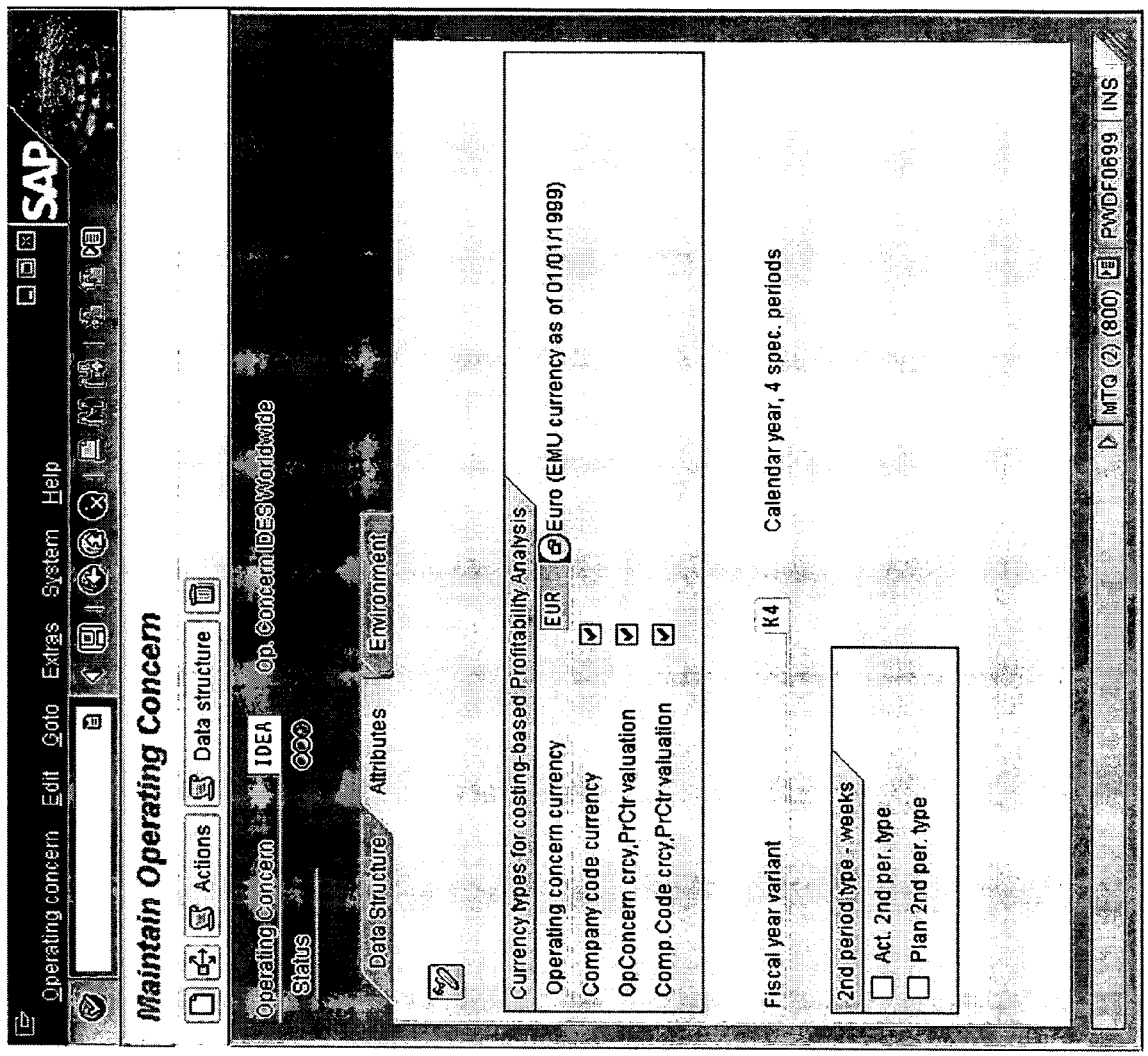
FIG. 7 illustrates another exemplary user interface for prompting and entering configuration data, consistent with an embodiment of the invention.

By way of example, FIGS. 6 and 7 illustrate exemplary user interfaces 600, 700 for prompting and collecting configuration data for the TKA01 and TKEB tables, respectively. These user interfaces may be used prior to configuration by the user (e.g., by the software producer, partner or a system administrator) or during configuration by the user. Alternatively, the exemplary user interfaces of FIGS. 6 and 7 may be eliminated and more generalized user interfaces may be utilized to collect input from the user and automatically generate the necessary configuration statements, as further described below.

To configure the software, a user may first select a scenario (see, e.g., FIG. 3). To this end, a user interface (such as a GUI) may prompt the user to select from a plurality of scenarios, such as from a plurality of business scenarios. Returning again to the example of FIG. 4, assume that a user selects a business scenario such as combined cost and profitability management. The selection of this scenario may cause the configuration platform or system (see, e.g., FIG. 2) to prompt the user for specific input or configuration data to configure the software. This may be achieved through use of template(s) for the TKA01 and TKEB tables and/or the introduction of a wizard-like table (TKC) as part of the simplification content 420.

Figure 8:
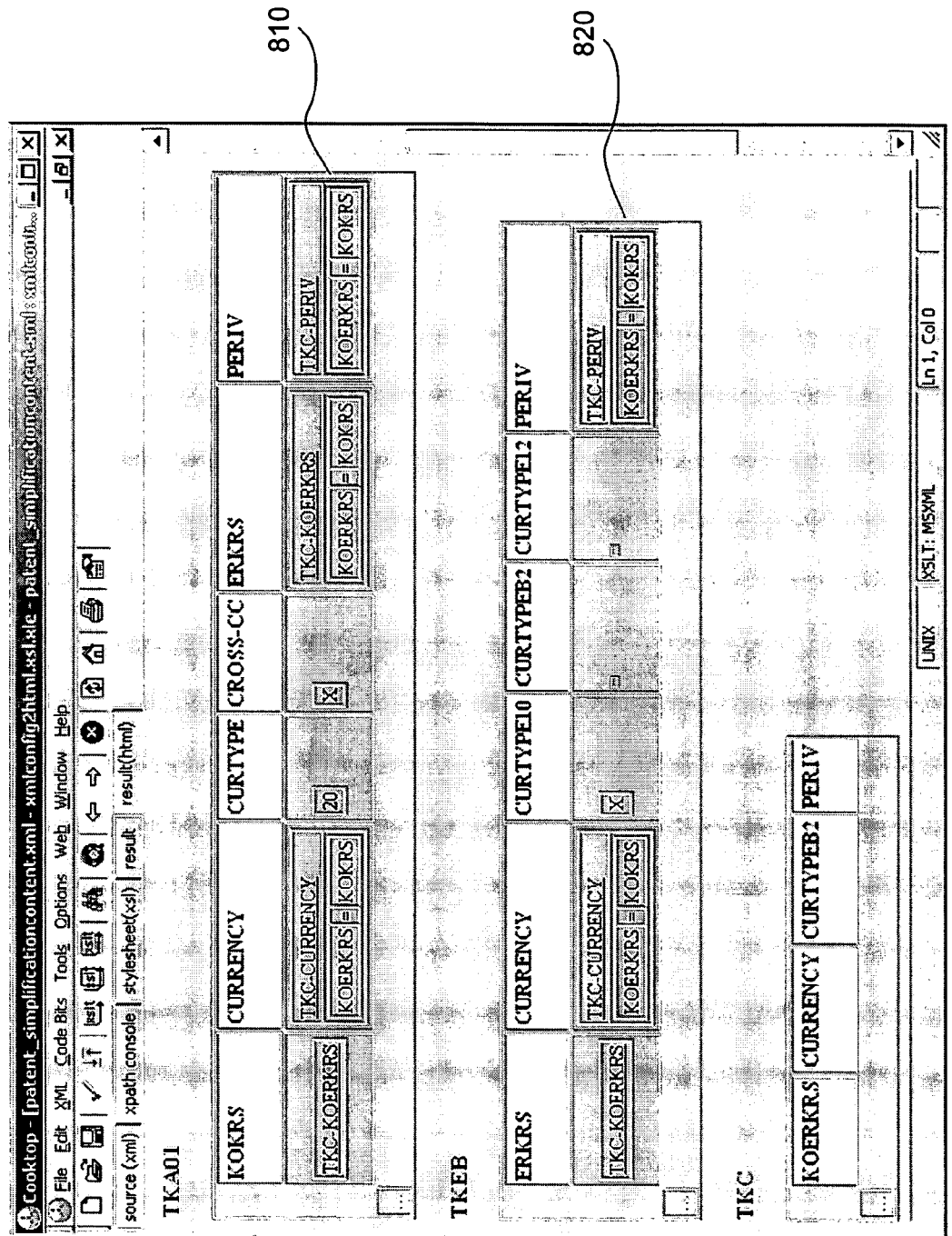
FIG. 8 illustrates exemplary templates that may be used in combination with the example of FIG. 4.

A user interface (such as a GUI-not shown) may be utilized to prompt a user to enter configuration data for table TKC. As illustrated in FIG. 8, the required content for table TKC may be more generalized or simplified than that for tables TKA01 and TKEB. For instance, in relation to the example of FIG. 4 showing simplification content 420, table TKC may include a number of parameters, such as the cost-profitability-area parameters "KOERKRS," "CURRENCY," "CURTYPE2," and "PERIV." The "KOERKRS" parameter may specify a merged relationship between a controlling area and a profitability area. Based on user's input for table TKC, parameters associated with the templates for tables TKA01 and TKEB may be utilized by the configuration framework or system to generate the necessary configuration statements. By way of example, each of the tables TKA01 and TKEB include a template represented by row 810 and 820, respectively. Alternatively, the templates may be bundled into a configuration file (not shown). These templates may comprise a set of rules for generating the required configuration statements. As shown in FIG. 8, column KOKRS of the table TKA01 includes the parameter "TKC-KOERKRS," which indicates a rule that the value of the "KOERKRS" field in the TKC table should be used to generate the KOKRS value in the TKA01 table. Similarly, column ERKRS of the TKEB table includes the parameter "TKC-KOERKRS," which indicates a rule that the value of the "KOERKRS" field in the TKC table should be used to generate the ERKRS value in the TKEB table. Column CURRENCY of the TKA01 table indicates a rule that the value of the "CURRENCY" filed in the TKC table should be used to generate the CURRENCY value in the TKA01 table only if the value of the "KOERKRS" field in the TKC table is equal to the value of the "KOKRS" field in the TKA01 table. For other parameters or fields, predefined content may be set or defined in the template. For instance, in the column CURTYPE of the TKA01 table, a predefined value of "20" is set, which implies a rule of setting the value CURTYPE to "20". Moreover, for still other fields in the tables, the template may include parameters indicating that a selection has been made, such as a selection indicated by a user selecting a check box (see, e.g., the "X" value for the CROSS-CC field in the TKA01 table).

Figure 9:
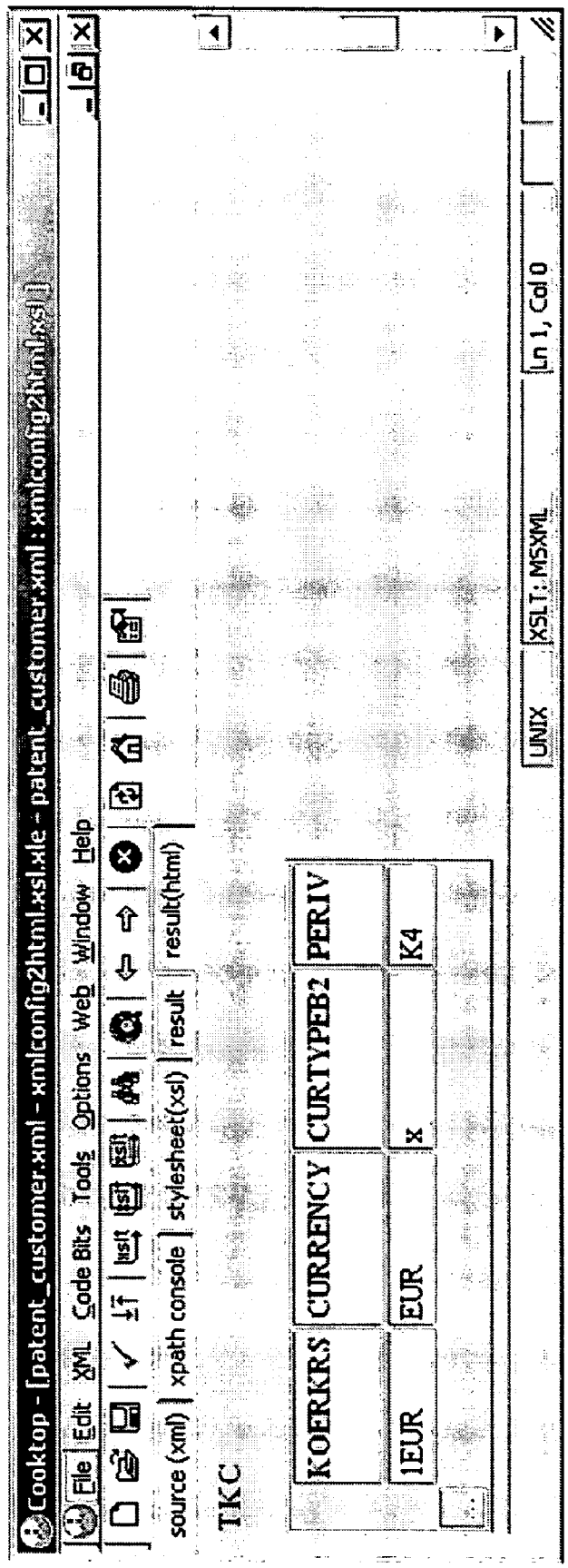
FIG. 9 illustrates an exemplary configuration statement based on input from a user.
Figure 10:
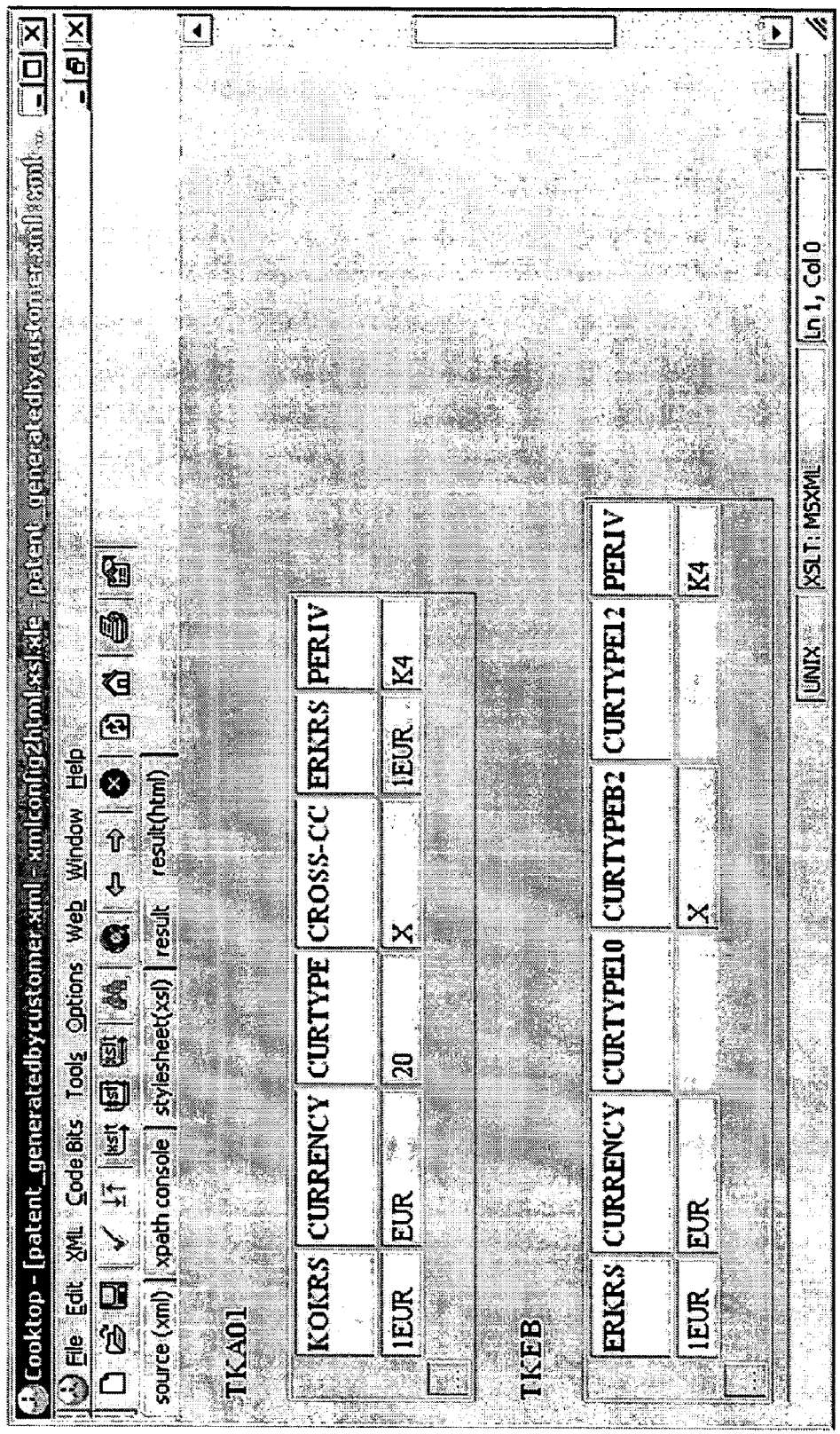
FIG. 10 illustrates further exemplary configuration statements based on input from a user.

Referring again to the example of FIG. 4, the user may be prompted to enter configuration data for the TKC table using, for instance, a user interface such as a GUI. Assume, for purposes of illustration, that the user enters the following values for the TKC table: KOERKRS="1EUR"; CURRENCY="EUR"; CURTYPEB2="X"; and PERIV="K4." In one embodiment, data entered by the user may be checked for errors (see, e.g., step 330 in FIG. 3) and then saved. As shown in FIG. 9, the configuration data entered by the user may be saved according to the structure of the TKC table, which represents customer content 430, as described in connection with FIG. 4. This data may then be processed according to the rules of the applicable templates to generate the necessary configuration statements for the more technical tables (i.e., instantiated tables TKA01 and TKEB). For example, in one embodiment, content repository module 225 of FIG. 2 will apply the rules of the templates to the user entered configuration data to generate the configuration statements, which are then stored in database 245 of active content module 235. FIG. 10 illustrates the configuration statements generated by content repository module 225 for TKA01 and TKEB based on the configuration data entered by the user and the template rules. This may represent additional customer content for the customer corporate configuration 430. As will be appreciated, the amount of configuration data entered and configuration statements generated is not critical to the invention and, thus, any number of wizard-like tables (i.e., TKC table) or configuration tables (i.e., TKA01 and TKEB tables) may be utilized.

As shown in FIG. 4, multiple content levels may be generated for configuring the software. A customer corporate configuration 430 may comprise customer or user content that is applicable, for instance, at a group or corporate-wide level. Such content may be represented by one or more entries by the user to the TKC table. Configuration data received from a user inputting data into the TKC table may then be used to generate configuration statements. If needed, one or more customer subsidiary configurations 440 may also be implemented for use in subsidiary systems. The subsidiary content may be represented by one or more entries of the TKC table or through different instances of the TKC table. For instance, in one embodiment, different instances of the software may be configured and stored at a customer's location. Access to the different instances may be controlled through different user IDs, profiles and/or other conventional techniques.

Figure 11A:
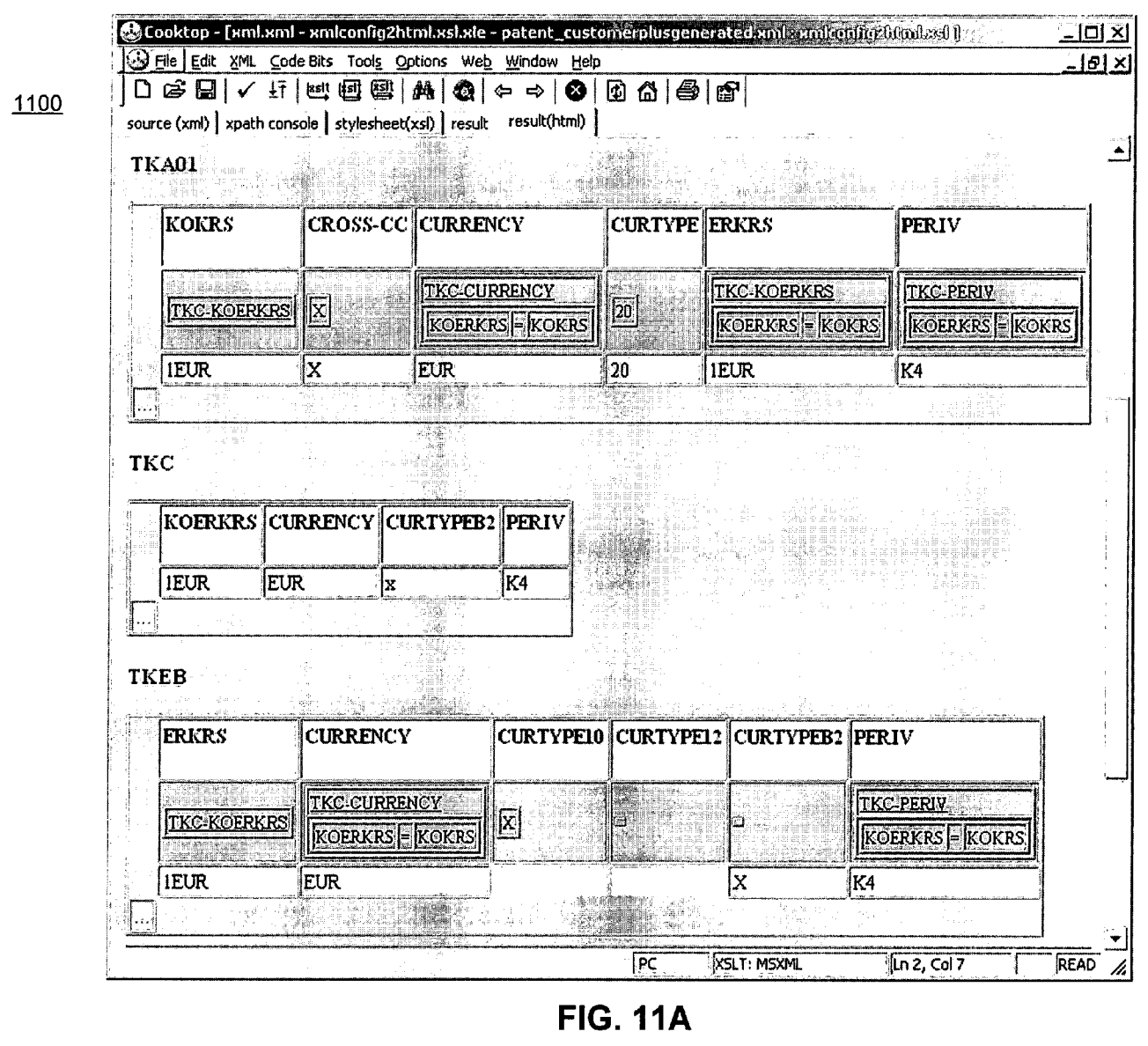
Figure 11B:
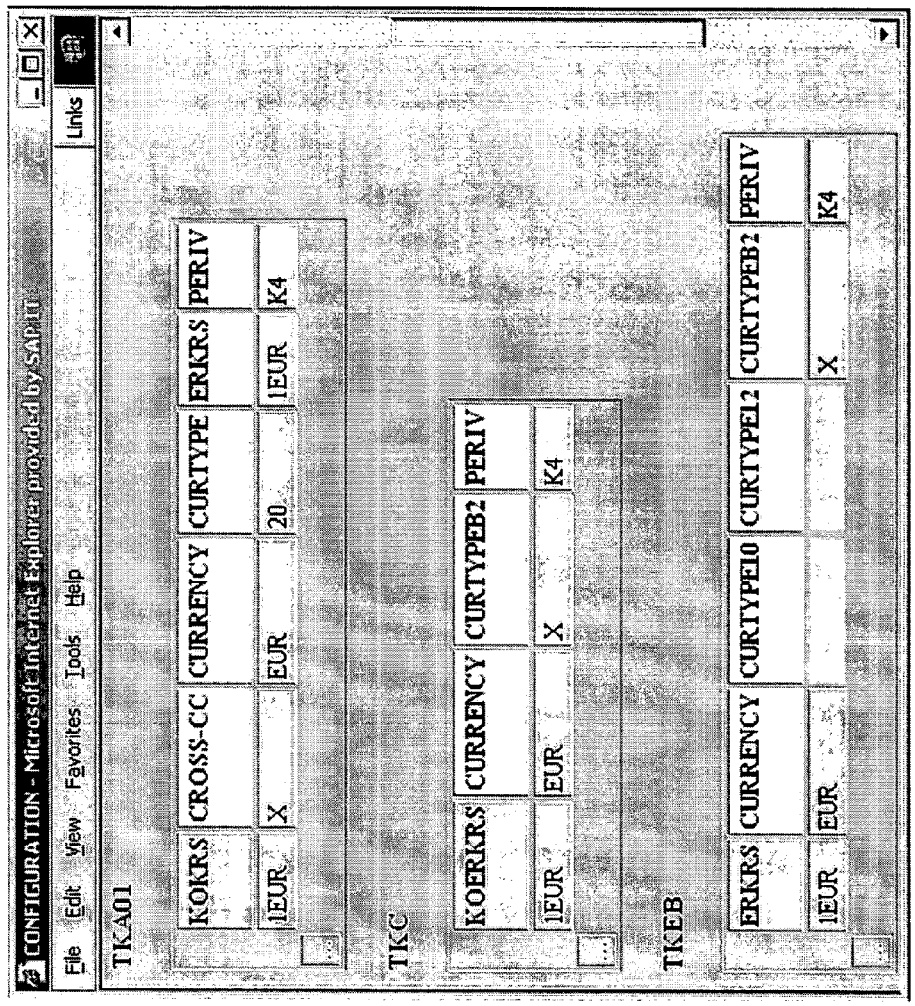
FIG. 11B illustrates an example of the content that may be generated for the configuration of software after the templates are removed.

The complete configuration content that makes up the customer content level and that is stored on the customer side may comprise the configuration data entered by the user, as well as the configuration statements generated through application of the set of rules of the templates. As shown in FIG. 11A, the customer or user-supplied content may be stored as part of the TKC table. Further, all of the generated statements may be stored in the TKA01 and TKEB tables, along with the applicable templates. In one embodiment, persistence of the templates may enable a customer or user to generate new configuration data to reconfigure the software, as needed, in the future. FIG. 11B illustrates an example of the content that may be generated for the configuration of software after the templates are removed. Preferably, the templates are removed before the content is stored in database 245 of active content module 235.

Figure 12:
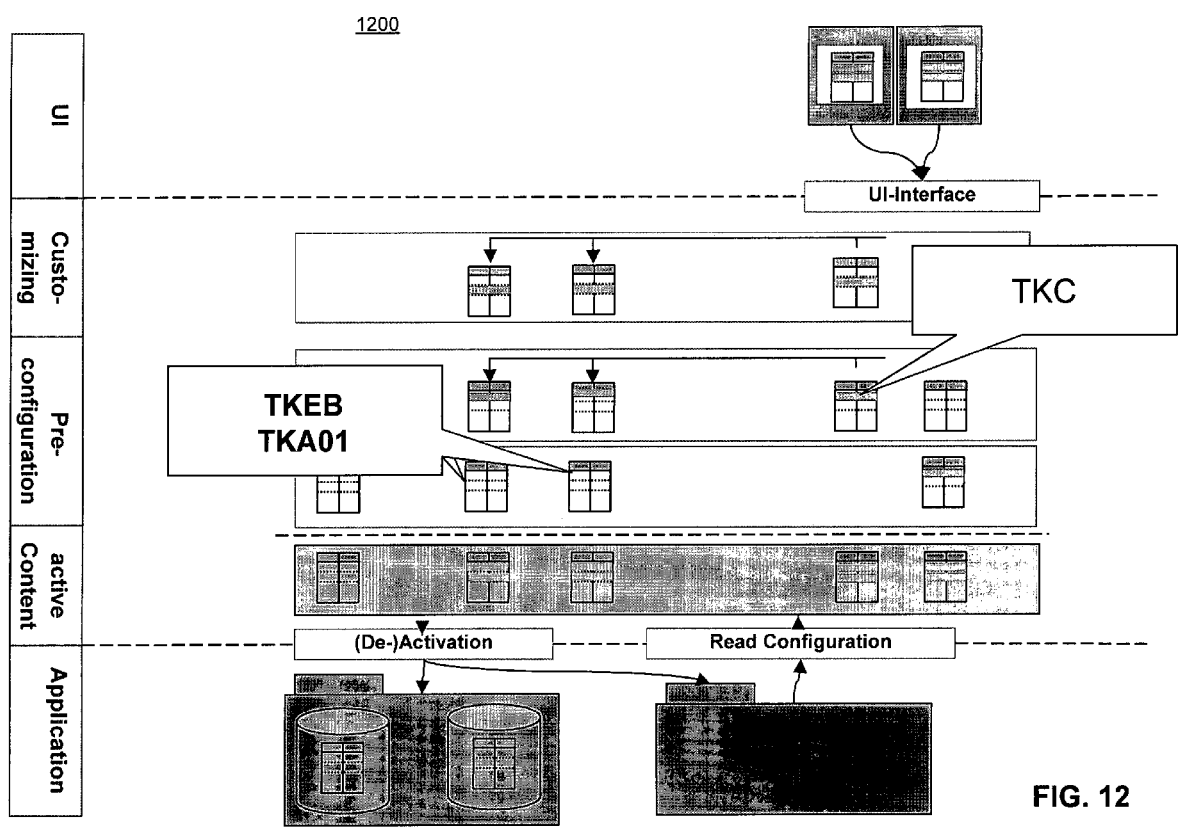
FIG. 12 illustrates a further diagram to demonstrate the principles of the invention in relation to the exemplary multi-level software configuration of FIG. 4.

FIG. 12 illustrates a further diagram to demonstrate the principles of the invention in relation to the exemplary multilevel software configuration of FIG. 4. As shown in FIG. 12, at a user interface (UI) level, a customer or user provides input to the configuration platform. This input may comprise the selection of a scenario and configuration data to complete a more generalized or wizard-like table (e.g., table TKC). At the customizing stage, this data may be checked for errors and then stored. Thereafter, in the pre-configuration stage, the relevant templates may be applied to generate the configuration statements (e.g., instances of the TKA01 and TKEB tables). In particular, predefined rules in the templates can be applied to generate the necessary configuration statements based on the input in the TKC table. The resultant configuration statements may be utilized during run-time by the configurable software components (designated by the heading "Application" in FIG. 12). This may require the software to read the appropriate configuration statements to apply data or values, perform functions or computations, etc. as configured by the user. As needed, the active content may be updated, with the deactivated content being reported to the configurable software components and the configuration statements being identified and, thereafter, read during run-time.

As will be appreciated, storage mediums and databases may also be used to implement embodiments of the invention. Such structures may temporarily or permanently store data and instructions. Although storage functions may be provided as part of a computer, memory functions can also be implemented in a network, processors (e.g., cache, register), or elsewhere. Various types of storage mediums can be used to implemented features of the invention, such as a read only memory (ROM), a random access memory (RAM), or a memory with other access options. Further, memory functions may be physically implemented by computer-readable media, such as, for example: (a) magnetic media, like a hard disk, a floppy disk, a magnetic disk, a tape, or a cassette tape; (b) optical media, like an optical disk (e.g., a CD-ROM), or a digital versatile disk (DVD); (c) semiconductor media, like DRAM, SRAM, EPROM, EEPROM, memory stick, and/or by any other media, like paper.

Embodiments of the invention may also be embodied in computer program products that are stored in a computer-readable medium or transmitted using a carrier, such as an electronic carrier signal communicated across a network between computers or other devices. In addition to transmitting carrier signals, network environments may be provided to link or connect components in the disclosed systems. Networking environments are commonplace in offices, enterprise-wide computer networks, intranets and the Internet (i.e., the World Wide Web). The network can be a wired or a wireless network. To name a few network implementations, the network is, for example, a local area network (LAN), a wide area network (WAN), a public switched telephone network (PSTN), an Integrated Services Digital Network (ISDN), an infra-red (IR) link, a radio link, such as a Universal Mobile Telecommunications System (UMTS), Global System for Mobile Communication (GSM), Code Division Multiple Access (CDMA), or a satellite link.

Transmission protocols and data formats are also known, for example, as transmission control protocol/internet protocol (TCP/IP), hyper text transfer protocol (HTTP), secure HTTP, wireless application protocol, unique resource locator (URL), unique resource identifier (URI), hyper text markup language (HTML), extensible markup language (XML), extensible hyper text markup language (XHTML), wireless application markup language (WML), Standard Generalized Markup Language (SGML), etc. Such features may be utilized to implement embodiments of the present invention, as disclosed herein.

While certain features and embodiments of the invention have been described, other embodiments of the invention will be apparent to those skilled in the art from consideration of the specification and practice of the embodiments of the invention disclosed herein. Furthermore, although embodiments of the present invention have been described as being associated with data stored in memory and other storage mediums, one skilled in the art will appreciate that these aspects can also be stored on or read from other types of computer-readable media, such as secondary storage devices, like hard disks, floppy disks, or a CD-ROM, a carrier wave from the Internet, or other forms of RAM or ROM. Further, the steps of the disclosed methods may be modified in any manner, including by reordering steps and/or inserting or deleting steps, without departing from the principles of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for configuring software, the method comprising:
   prompting a user to select a scenario for configuring the software;
   receiving, as input, a selected scenario from the user;
   further prompting the user to enter configuration data based on the selected scenario;
   applying at least one template to generate at least one configuration statement for the software, the at least one template comprising a set of rules for generating the at least one configuration statement based on the configuration data entered by the user;
   storing the at least one configuration statement as a collection of attribute values representing a user selected software configuration for software within a computer system; and
   applying the attribute values at software run-time to provide the user selected software configuration to the user during execution of the software on the computer system.

2. The method of claim 1, further comprising:
   storing the at least one configuration statement in a database, the at least one stored configuration statement being accessible at run-time to configure the software.

3. The method of claim 1, further comprising processing the configuration data in accordance with the rules to automatically generate a plurality of configuration statements for the software.

4. The method of claim 1, further comprising applying rules of a plurality of templates to generate configuration statements for one or more levels of content based on the configuration data.

5. The method of claim 4, further comprising merging the configuration statements into a configuration file.

6. The method of claim 5, further comprising bundling a plurality of configuration files into a configuration package to facilitate release management.

7. The method of claim 1,further comprising checking the configuration data entered by the user for errors prior to applying the set of rules of the at least one template.

8. The method of claim 1, wherein the set of rules comprise at least one of statements, formulas, and instructions and indicate how to process the configuration data to generate the at least one configuration statement.

9. The method of claim 1, further comprising providing at least one configuration aspect, and wherein generating the at least one configuration statement comprises forming an instance of the at least one configuration aspect.

10. The method of claim 9, wherein the instance is a line in a data table or an XML document.

11. A computerized system for configuring software, the system comprising:
- a graphical user interface (GUI) module for generating one or more graphical interfaces to provide output to and receive input from a user, the GUI module being adapted to generate at least one graphical interface to prompt the user to enter configuration data based on a selected scenario;
- a content repository module for providing at least one configuration statement to configure the software based upon the selected scenario and the configuration data entered by the user; and
- an active content module for storing the at least one configuration statement for the software,
- wherein the configuration statement for the software is processed by the computerized system at software run-time to provide, to the user, a software configuration previously entered by the user as the configuration statement during execution of the software on the computer system.

12. The system of claim 11, wherein the selected scenario is identified by prompting the user to select among a plurality of scenarios using a graphical user interface generated by the GUI module.

13. The system of claim 12, wherein the one or more graphical interfaces generated by the GUI module comprise a wizard-like interface.

14. The system of claim 13, wherein the at least one configuration statement comprises at least one of a relational database table description and an XML document.

15. The system of claim 11, wherein providing the at least one configuration statement comprises forming an instance of a configuration aspect.

16. The system of claim 15, wherein the instance is a line in a table or an XML document.

17. The system of claim 11, wherein the content repository module merges a plurality of configuration statements into a configuration file.

18. The system of claim 17, wherein the content repository module bundles a plurality of configuration files into a configuration package to facilitate release management.

19. A method for configuring software, the method comprising:
- prompting a user to make a selection from a plurality of scenarios displayed on a graphical user interface;
- receiving configuration data from the user to configure the software in accordance with the selected scenario;
- generating configuration statements using one or more templates and the configuration data received from the user;
- storing configuration statements in memory, the configuration statements being accessible in a run-time environment to configure the software; and
- configuring the software to operate according to the configuration statements generated from the configuration data that was received from the user.

20. The method of claim 19, wherein each template includes one or more rules, the rules defining how to process the configuration data to generate the configuration statements.

21. The method of claim 20, wherein the one or more rules comprise at least one of statements, formulas, and instructions.

22. The method of claim 20, further comprising checking the configuration data entered by the user for errors prior to applying the one or more rules to process the configuration data.

23. The method of claim 22, wherein if an error is detected in the configuration data entered by the user, the user is prompted to re-enter the data until no errors are found.

24. The method of claim 20, further comprising applying the parameters of each template to generate configuration statements for one or more levels of content based on the configuration data.

25. The method of claim 19, wherein the configuration statements comprise at least one of relational database table descriptions and an XML document.

26. The method of claim 19, further comprising:
- defining at least one configuration file, the configuration file comprising at least one of a list of required configuration files, a configuration aspect, a configuration statement, a constraint and a template.

27. The method of claim 19, wherein generating the configuration statements comprises forming an instance of a configuration aspect for at least one of the configuration statements.

28. The method of claim 27, wherein the instance is a line in a relational database table or an XML document.

29. The method of claim 19, further comprising merging the configuration statements into a configuration file.

30. The method of claim 29, further comprising bundling a plurality of configuration files into a configuration package to facilitate release management.

31. A method for multi-level configuration of software, the method comprising:
- providing basis content for the software;
- prompting a user to select among a plurality of different business scenarios;
- based on the business scenario selected by the user, further prompting the user enter configuration data;
- processing the configuration data entered by the user to generate configuration statements for one or more content levels that configure the basis content of the software; and
- configuring the software to operate according to the configuration statements generated from configuration data entered by the user.

32. The method of claim 31, wherein processing the configuration data comprises using one or more templates to process the configuration data.

33. The method of claim 32, wherein each template comprises one or more rules, the rules defining how to process the configuration data to generate the configuration statements.

34. The method of claim 33, wherein the one or more rules comprise at least one of statements, formulas, and instructions.

35. The method of claim 31, further comprising:
- defining at least one configuration file, the configuration file comprising at least one of a list of required configuration files, a configuration aspect, a configuration statement, a constraint and a template.

36. The method of claim 35, wherein the configuration statements comprise at least one of relational database table descriptions and an XML document.

37. The method of claim 31, wherein generating the configuration statements comprises forming an instance of a configuration aspect for at least one of the configuration statements.

38. The method of claim 37, wherein the instance is a line in a table or an XML document.

39. The method of claim 31, further comprising merging the configuration statements into a configuration file.

40. The method of claim 39, further comprising bundling a plurality of configuration files into a configuration package to facilitate release management.

41. A computer readable medium comprising programmable instructions adapted to cause a processor to perform a method for configuring software, the method comprising:
- prompting a user to select a scenario for configuring the software;
- receiving, as input, a selected scenario from the user;
- further prompting the user to enter configuration data based on the selected scenario;
- applying at least one template to generate at least one configuration statement for the software, the at least one template comprising a set of rules for generating the at least one configuration statement based on the configuration data entered by the user;
- storing the at least one configuration statement as a collection of attribute values representing a user selected software configuration for software within a computer system; and
- applying the attribute values at software run-time to provide the user selected software configuration to the user during execution of the software on the computer system.

42. The computer readable medium of claim 41, wherein the method further comprises processing the configuration data in accordance with the rules to automatically generate configuration content for the configuration table.

43. The computer readable medium of claim 41, wherein the method further comprises applying rules of a plurality of templates to generate configuration statements for one or more levels of content based on the configuration data.

44. The computer readable medium of claim 41, wherein the set of rules comprise at least one of statements, formulas, and instructions and indicate how to process the configuration data to generate the configuration statements.

45. The computer readable medium of claim 41, wherein generating the configuration statements comprises forming an instance of a configuration aspect for at least one of the configuration statements.

46. The computer readable medium of claim 45, wherein the instance is a line in a relational database table or an XML document.

47. The computer readable medium of claim 41, the method further comprising merging the configuration statements into a configuration file.

48. The computer readable medium of claim 47, the method further comprising bundling a plurality of configuration files into a configuration package to facilitate release management.

* * * * *